UNITED STATES PATENT OFFICE.

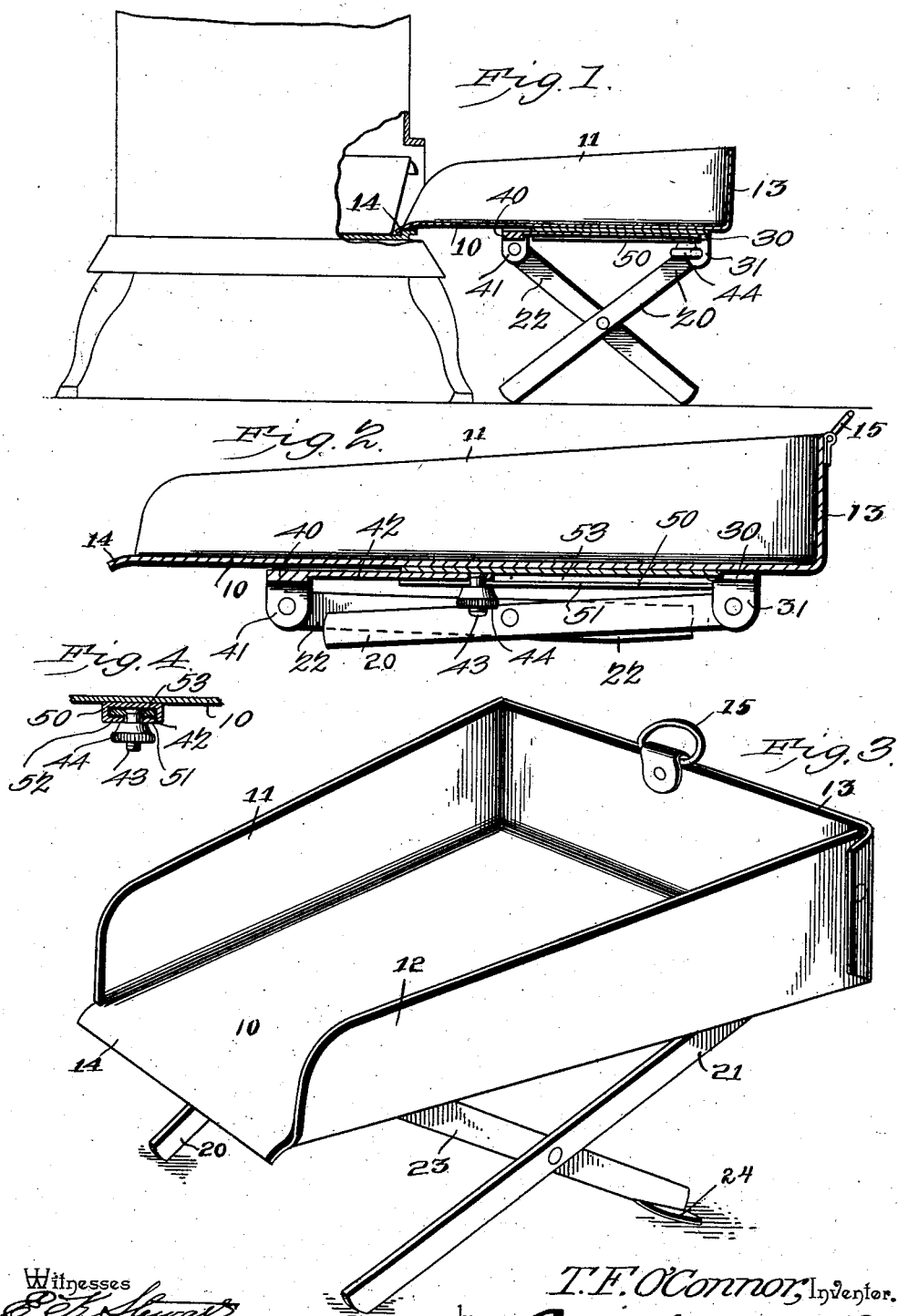

TIMOTHY FRANCIS O'CONNOR, OF SAUK CENTER, MINNESOTA.

SAFETY ASH-PAN.

SPECIFICATION forming part of Letters Patent No. 708,162, dated September 2, 1902.

Application filed January 6, 1902. Serial No. 88,647. (No model.)

*To all whom it may concern:*

Be it known that I, TIMOTHY FRANCIS O'CONNOR, a citizen of the United States, residing at Sauk Center, in the county of Stearns and State of Minnesota, have invented a new and useful Safety Ash-Pan, of which the following is a specification.

This invention relates to safety ash-pans.

The object of the invention is to provide a pan by means of which the ashes may be easily and quickly removed from the stove without spilling and without creating a dust and which avoids all danger from the dropping of coals or sparks upon the floor, and thereby causing a fire.

Figure 1 of the accompanying drawings represents a side elevation of a stove having the front portion thereof broken away and showing a longitudinal vertical section of this safety ash-pan in applied position. Fig. 2 represents a longitudinal vertical section of said pan with its support shown folded thereunder. Fig. 3 represents a perspective view of this improved pan. Fig. 4 represents a transverse section through the bottom of the pan, showing the adjusting means for the support.

The same reference-numerals indicate corresponding parts in all the figures.

This improved pan may be made in any desired shape and of any desired material, preferably of zinc. In the form shown a pan is illustrated having a bottom 10, vertical sides 11 and 12, and a connecting back piece 13, riveted at its opposite ends to the ends of the side pieces 11 and 12. The pan is preferably provided with a mouth at the front end thereof having a downwardly-inclined projecting lip 14, extending from the bottom 10 and adapted to be projected underneath an ordinary stove-pan inside the fire or ash box. The stove ash-pan is then drawn over this lip 14 into the safety ash-pan and no ashes or fire permitted to fall between the two pans onto the floor or carpet.

A ring 15 is preferably attached to the pan, at the rear thereof, for hanging it up out of the way when not in use.

The pan is preferably provided on its bottom with adjustable supporting means, whereby the pan may be supported at any desired height and made to fit stoves of different heights without its being necessary for the operator to bear the weight of the pan when shifting the ashes or stove-pan from the stove into the safety-pan. In the form illustrated this supporting means comprises four legs 20, 21, 22, and 23, two of which, 20 and 21, are attached to the bottom of the pan, at the rear thereof near its opposite corners, by means of angular arms, as 30, which are riveted to the pan. The downwardly-extending arms, as 31, thereof are perforated and are pivoted to the upper ends of the legs 20 and 21. The front legs 22 and 23 are pivotally connected at their upper ends to downwardly-extending arms, as 41, of a cross-bar 40, to the center of which an inwardly-extending bar 42 is rigidly fastened. This bar 42 is preferably provided near its free end with a downwardly-extending screw-threaded stud 43, on which a thumb-nut 44 is screwed.

A shoe or guideway 50 is attached longitudinally to the bottom of the pan, preferably at the center thereof. This guideway is preferably formed by riveting a metal strip to the bottom of the pan and folding or bending the opposite edges thereof downwardly and inwardly on a plane parallel with the body of said strip and having a space formed between said lips 51 and 52 and the bottom of the strip 50 to provide room for the bar 42 to slide therebetween. A space or slot 53 is also left between the inner edges of the lips 51 and 52 to permit the stud 43 to move freely between them. The legs 20 and 22 on one side of the pan are crossed on each other and pivotally connected at a point below the centers thereof. The legs 21 and 23 on the opposite side are similarly crossed and connected. The free ends of the front legs 22 and 23 are preferably provided on their lower edges with ears or lugs, as 24, for lapping over and engaging the lower edges of the legs 20 and 21 to prevent the legs from reaching and passing the center, which would lock them and render it impossible to adjust the legs by means of the slide.

In the operation of the device, the legs being attached as described, the bar 42, carrying the screw-threaded stud 43, is slid into the shoe 50, and the lips 51 and 52 thereof engage the edges of said bar and permit it to slide freely thereunder, the stud 43 projecting through the slot 53, formed between said lips. The thumb-nut 44 is screwed on this stud 43 and is adapted to be screwed down at any point and engage the lips 51 and 52 to hold the bar 42 firmly against movement. When it is desired to adjust the ash-pan to any desired height, the legs are opened until the desired height is obtained, the thumb-nut being loosened and the bar 42 sliding freely in the shoe, and when the pan is adjusted to the desired height the nut 44 is screwed down against the lips 51 and 52 and the legs are held firmly in position. When not in use, the thumb-nut is loosened, the legs folded down into their lowermost position, with the ears, as 24, engaging the adjacent legs.

While this pan is especially designed to serve as a pan for removing ashes from a stove thereinto and conveying them to a convenient point or for slipping the pan ordinarily used in an ash-box of a stove, it may also be used itself as a stove-pan when desired.

I claim as my invention—

1. An ash-pan open on one side and having a shoe or guideway 50 on the under side of its bottom, two pairs of supporting-legs, crossed and pivotally connected together, fixed bearings pivotally connecting one pair of said legs to the bottom of the pan, a cross-bar having downwardly-extending bearings for the other pair of legs, and a bar 42, extending inwardly from the cross-bar, operating in the shoe or guideway and having means to adjustably secure it therein, substantially as described.

2. An ash-pan having two pairs of supporting-legs crossed and pivotally connected together, fixed bearings pivotally connecting one pair of said legs to the bottom of said pan, slidable bearings pivotally connecting the other pair of said legs to said pan, a guide for said slidable bearings, means to secure the latter when adjusted, and laterally-extending ears 24 at the outer ends of one pair of said legs, at the under sides thereof, substantially as described.

In testimony that I claim the foregoing as my own I have hereto affixed my signature in the presence of two witnesses.

TIMOTHY FRANCIS O'CONNOR.

Witnesses:
M. C. KELSEY,
T. J. KILLEEN.